United States Patent [19]

Uhlenkamp

[11] Patent Number: 4,688,089
[45] Date of Patent: Aug. 18, 1987

[54] CIRCUIT ARRANGEMENT FOR DETECTING MOTION IN A TELEVISION PICTURE

[75] Inventor: Dirk Uhlenkamp, Pforzheim, Fed. Rep. of Germany

[73] Assignee: Standard Elektrik Lorenz AG, Stuttgart, Fed. Rep. of Germany

[21] Appl. No.: 886,178

[22] Filed: Jul. 15, 1986

[30] Foreign Application Priority Data

Jul. 25, 1985 [DE] Fed. Rep. of Germany ....... 3526596

[51] Int. Cl.⁴ .............................................. H04N 7/18
[52] U.S. Cl. .................................... 358/105; 358/136; 358/166
[58] Field of Search ............... 358/105, 166, 11, 21 R, 358/136, 125, 126

[56] References Cited

U.S. PATENT DOCUMENTS

| | | | |
|---|---|---|---|
| 3,890,462 | 6/1975 | Limb et al. ...................... | 358/105 X |
| 4,090,221 | 5/1978 | Connor ........................... | 358/105 X |
| 4,232,338 | 11/1980 | Netravali et al. ............... | 358/105 X |
| 4,296,436 | 10/1981 | Achiha ............................. | 358/105 X |
| 4,307,420 | 12/1981 | Ninomiya et al. ................. | 358/136 |
| 4,539,594 | 9/1985 | Illetschko ....................... | 358/166 X |
| 4,626,891 | 12/1986 | Achiha ............................. | 358/105 X |
| 4,636,862 | 1/1987 | Hatori et al. ........................ | 358/166 |

Primary Examiner—Michael A. Masinick
Assistant Examiner—E. Anne Toth
Attorney, Agent, or Firm—Spencer & Frank

[57] ABSTRACT

To detect horizontally moving portions of a TV frame formed from two adjacent fields, the vertical local frequency at a vertical edge of the moving portion of the picture is measured with a narrow-band-pass filter circuit which is tuned to the local frequency of the comblike structure at ta vertical edge of staggered lines of the two fields of the frame. When such an edge structure is detected, the circuit delivers a detection signal.

6 Claims, 5 Drawing Figures

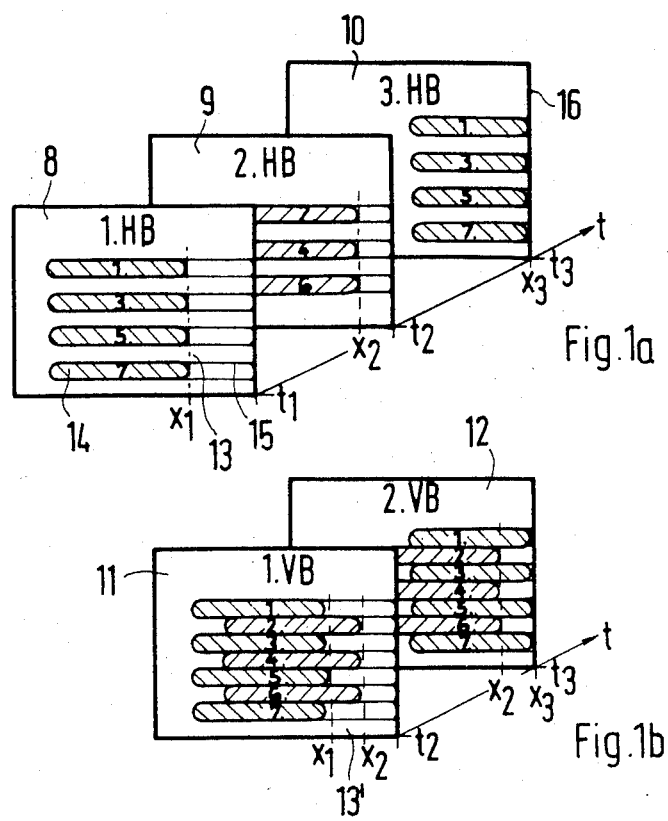
Fig. 1a
Fig. 1b
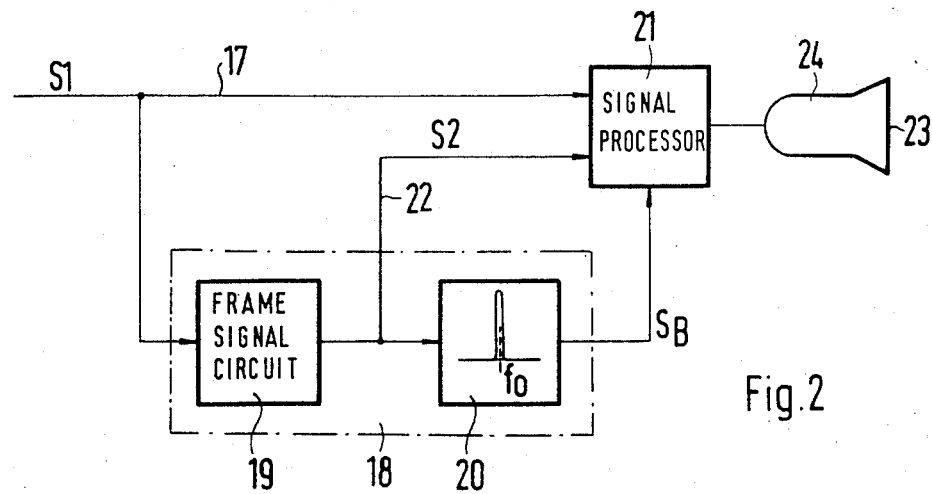
Fig. 2

CIRCUIT ARRANGEMENT FOR DETECTING MOTION IN A TELEVISION PICTURE

BACKGROUND OF THE INVENTION

The invention pertains to a circuit arrangement for detecting horizontally directed motion of an edge in a television picture.

In conventional television-picture reproduction systems, successive fields are displayed on a screen using interlaced scanning. For so-called frame reproduction, two temporally adjacent fields one of which was delayed by the transmission time of a field are simultaneously presented on the screen by interleaving the lines of the two fields. FIG. 1a shows schematically three successive fields 8, 9 and 10 with scanning lines 1 to 7. FIG. 1b shows the frames 11 and 12 formed from those fields. The fields have a vertical edge 13 at which lines 1 to 7 change from a dark picture area 14 to a bright picture area 15. In the course of the scene, this edge 13 moves in the horizontal direction toward the right margin 16 of the picture, so that the edge 13 is in the location x1 of the first field at the time $t_1$, in the location x2 of the second field at the time $t_2$, and in the location x3 of the third field at the time $t_3$. Since the locations $x_1$, $x_2$ and $x_3$ in the three fields 8, 9 and 10 are shifted relative to each other, in the first frame 11 formed from the two fields 8 and 9, the edge-forming transitions at $x_1$ are shifted relative to the edge-forming transitions at $x_2$. In the display of a frame, the moving edges 13 of the fields thus become a blurred bar 13' whose width is equal to the distance between $x_2$ and $x_1$ and which, on close examination, has a serrate structure.

To reduce or eliminate such picture unsharpness caused by the comblike serrate structure at a moving edge, it is first necessary to detect the places of such motion blur in the television frame and to produce a position-dependent detection signal. Such motion detection can also be used for other frame-signal-processing purposes, such as frame reproduction at increased frame frequency, frame reproduction with noise elimination systems, or frame reproduction with cross-color reduction in the PAL standard.

German Patent Application No. P34 44 836 discloses a detection circuit which requires three field delay circuits of which at least two are connected in series. By a subtracter, the Line signals of every first and third field are locally compared, and if the signal contents disagree, an output signal is produced which, after formation of the absolute value, amplitude weighting, and passage through a further delay circuit, is outputted as a detection signal. That detection circuit requires a large amount of circuitry since each field delay circuit for temporarily storing the information of a field represents a memory circuit with considerable memory location requirements.

SUMMARY OF THE INVENTION

One object of the invention is to provide a detection circuit arrangement which only needs a relatively small amount of storage.

A motion detection circuit in accordance with the invention requires only a single field delay circuit, so that it needs a considerably smaller amount of storage than conventional motion detection circuits. In addition, it has been found that the motion detection in conventional motion detector circuits fails if particular speeds of motion of periodic picture structures occur during frame reproduction, particularly if the picture structure moves by just one cycle during two field periods. Such a failure is avoided in the motion detection circuit according to the invention by detecting transitions in the vertical rather than the horizontal direction, namely by the vertically oriented detection of periodically recurring comblike picture structures having a defined vertical local frequency.

To detect horizontally moving portions of a TV frame formed from two adjacent fields, the vertical local frequency at a vertical edge of the moving portion of the picture is measured with a narrow-band-pass filter circuit which is tuned to the local frequency of the comblike structure at a vertical edge of staggered lines of the two fields of the frame. When such an edge structure is detected, the circuit delivers a detection signal.

The narrow-band-pass filter circuit used in the motion detector circuit according to the invention can be implemented using linear signal-processing principles, e.g., as a correlation filter, or non-linear techniques. Further in accordance with the invention an improved band-pass filter circuit used requires little circuitry and has a very narrow bandwidth, a very short transient time and delivers a relatively large output signal. The narrow-band-pass filter circuit is designed to produce a usable output signal already after few (three or four) input pulses.

BRIEF DESCRIPTION OF THE DRAWING

The invention will be better understood from a reading of the following detailed description in conjunction with the drawing in which:

FIGS. 1a and 1b are schematic representations of adjacent fields and of frames formed therefrom;

FIG. 2 is a block diagram of a motion detector circuit arrangement, and

DETAILED DESCRIPTION

Figure 3:
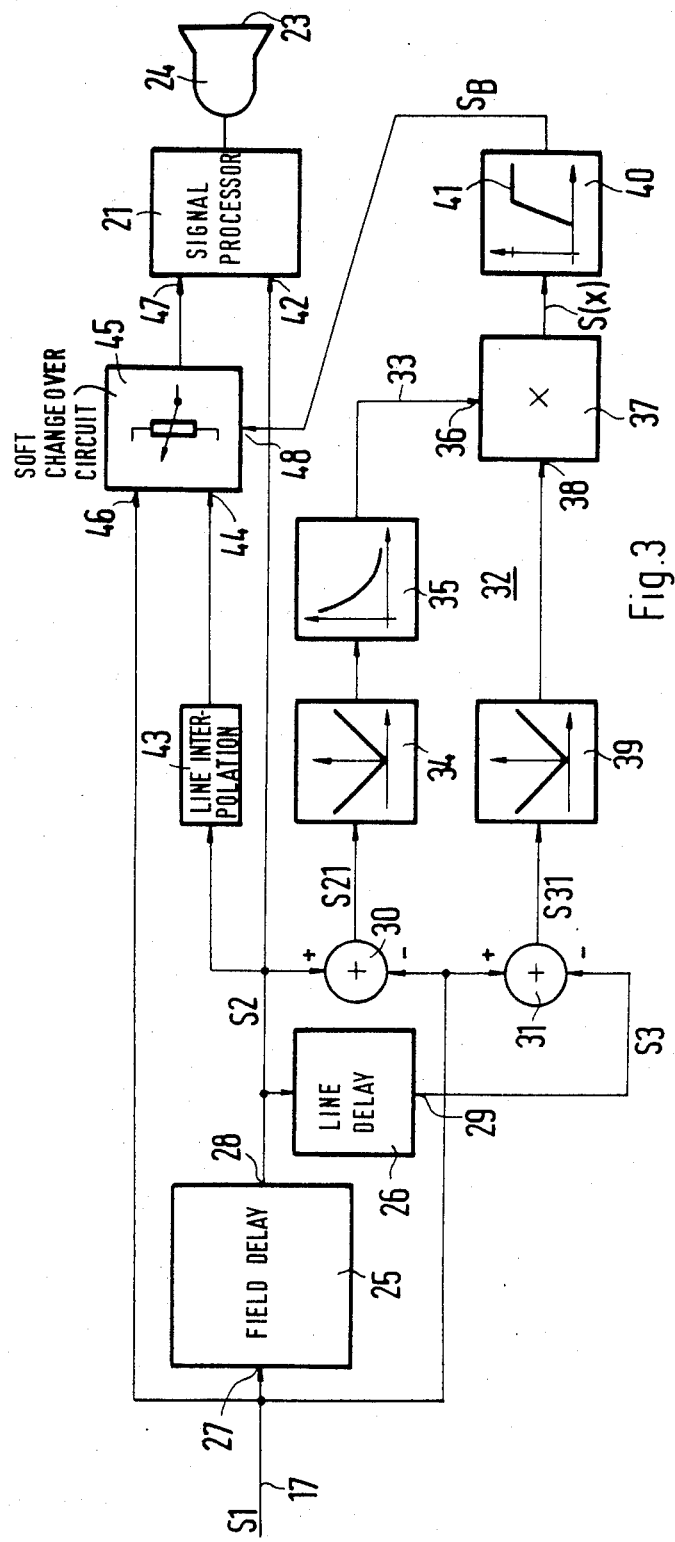
FIGS. 3 and 4 are more detailed block diagrams of motion detector circuit arrangements.

The block diagram of FIG. 2 shows the basic configuration of a motion detector circuit 18 connected to a video signal line 17 of a television set (not shown in detail). The circuit arrangement 18 includes a frame-signal circuit 19 and a narrow-band-pass filter circuit 20. The pass frequency fo of the band-pass filter circuit 20 is tuned to the so-called vertical local frequency of the comblike serrate structure of the edge stripe 13' resulting from the movement of a vertical edge between the places $x_1$ and $x_2$ of the frame 11 of FIG. 1b. Consequently, the pass frequency of the narrow-band-pass filter circuit is equal to the number of line pairs per frame which are formed from the corresponding lines of the two fields of the frame, multiplied by the number of frames per second. A line pair of the frame 11 of FIG. 1b is formed, for example, by the two adjacent lines 1 and 2, with line 1 coming from the first field 8 of FIG. 1a, and line 2 being the corresponding line of the second field 9. The structure of the edge stripe 13' shown in the frame 11 of FIG. 1b is typical of a horizontally moving picture area with a vertical edge portion. Therefore, an output signal $S_B$ of the band-pass filter circuit 20, which is tuned to this characteristic frequency fo, indicates unambiguously any horizontal motion of the detected picture area. This output signal is applied to a video-signal processor 21 which creates a frame (e.g., 11 in FIG.

1b) from the video signals on the video-signal line 17, which were produced by interlaced scanning, and video signals of two successive fields, which were delayed by one field period in the frame-signal circuit 19 and applied over a line 22. This frame is displayed on the screen 23 of a picture tube 24.

In the embodiment of a motion detector circuit arrangement shown in FIG. 3, the frame-signal circuit 19 consists of a field delay circuit 25 having its input 27 connected to the video-signal line 17, and a line delay circuit 26 connected to the output of the circuit 25. The field delay circuit delays the picture signals appearing at its input 27 by one field period, and the line delay circuits introduces a delay equal to the period of one line of this field. Connected to the input 27 and the output 28 of the field delay circuit and to the output 29 of the line delay circuit 26 are two adders 30 and 31 each having a positive input and a negative input, which are part of a computing circuit 32 forming the narrow-band-pass filter circuit. The output of the first adder 30, which forms a first difference value S21 from the input signal S1 and the output signal S2, is coupled to an output channel 33 which contains an absolute-value device 34 and a reciprocal-value device 35 and leads to a first input 36 of a multiplier 37. The output of the second adder 31, which forms a second difference value S31 from the input signal S1 of the field delay circuit 25 and the output signal S3 of the line delay circuit 26, is coupled through a second absolute-value device 39 to a second input 38 of the multiplier 37. The multiplication of the absolute value of the reciprocal of the first difference value S21 by the absolute value of the second difference value S31 gives a signal S (x) at the output of the multiplier 37 which is dependent on the location x in the scanning line according to the following function:

$$S(x) = (\tfrac{1}{4})(1 + tg^2(2/\pi)(f(x)/fo))$$

where fo is the frequency to which the computing circuit 32 forming the band-pass filter circuit is tuned, represented as the vertical local frequency, e.g., fo=312.5 cycles per picture height, and f (x) is the vertical local frequency of the picture pattern in the place x of the detected frame. This computing function has the advantage of being independent of the location x and of the modulation depth of the input signal, and of rapidly tending to infinity, which is equivalent to a narrow bandwidth.

Because of the limited accuracy of computation and the quantization of the signal in a digital system, however, this independence of the place of detection and of the limit value "infinity" is not actually attainable. Therefore, the output of the multiplier 37 is followed by a weighting circuit 40 which subjects the output signal S (x) of the multiplier to a nonlinear weighting function 41, so that quite narrow-band detection is achieved for the vertical local frequency fo.

The output signal S2 of the field delay circuit 25 is also applied to the first input 42 of the video-signal processor 21 for displaying a frame on the screen 23 of the picture tube 24 and, through a line interpolation circuit 43, to a first input 44 of a soft-changeover circuit 45. The second input 46 of the soft-changeover circuit is connected to the video-line 17, while the output of the soft-changeover circuit is coupled to the second input 47 of the video-signal processor 21. In the absence of an output signal $S_B$ from the weighting circuit 40, whose output is connected to a control input 48 of the soft-changeover circuit, essentially the video signal S1 is applied through the soft-changeover circuit to the second input 47 of the video-signal processor. In the presence of an output signal $S_B$ from the weighting circuit 40, which indicates a moving section of the picture, an increasing share of the output signal S2 of the field delay circuit 25, which signal was modified by the circuit 43, is applied to the second input 47 of the video-signal processor in accordance with the amplitude of the signal from the weighting circuit. By this, any motion blur of the vertical edges of horizontally moving portions of the picture is largely prevented.

Figure 4:
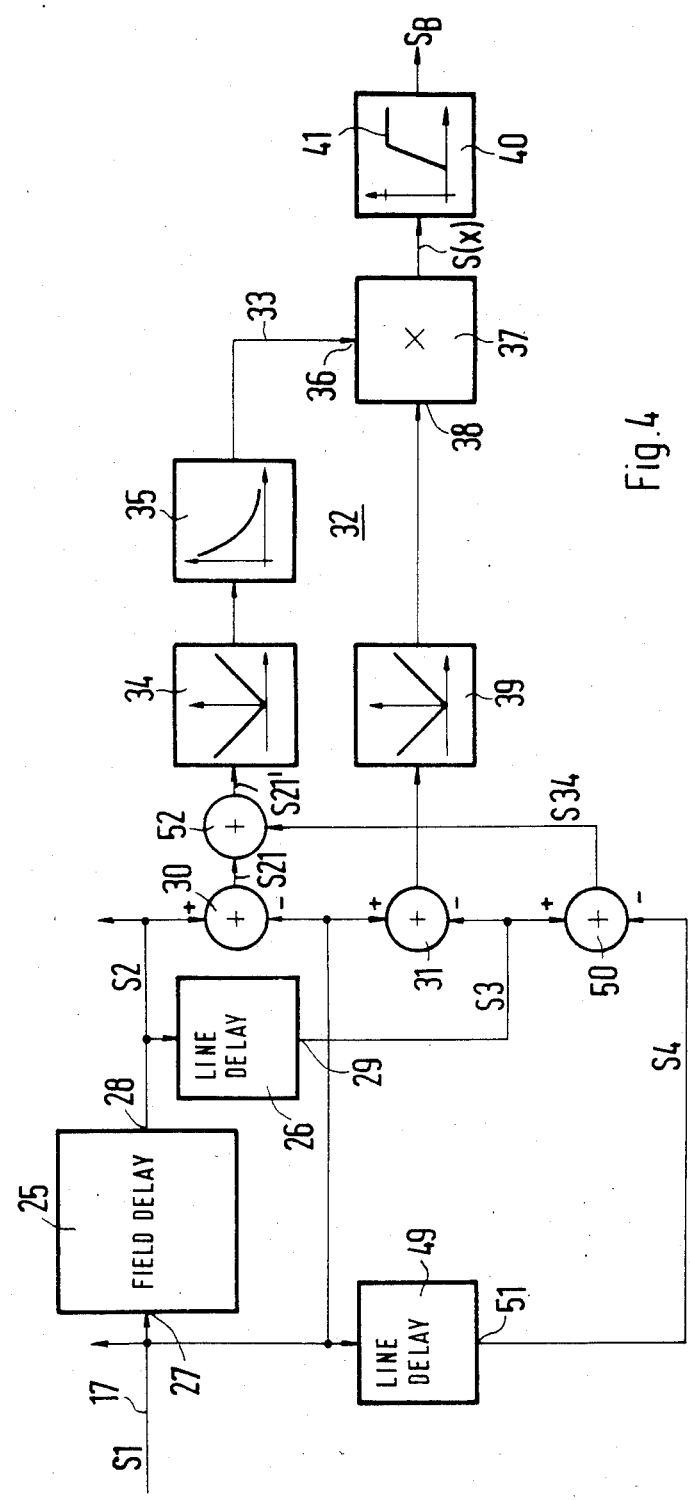

The motion detector circuit shown in FIG. 4 differs from the motion detector circuit 18 of FIG. 3 essentially in that a second line delay circuit 49 is connected to the input 27 of the field delay circuit 25, and that the computing circuit 32 includes a third adder 50 with a positive input and a negative input. This adder 50 forms a third differences value S34 from the video signals S3 at the output 29 of the first line delay circuit 26 and the video signals S4 at the output 51 of the second line delay circuit 49. From the difference value S21 of the first adder 30 and the difference value S21 of the first adder 30 and the difference value S34 of the third adder 50, a fourth adder 52 in the output channel 33 forms a sum value S21', which takes the place of the difference value S21 of the first adder 30 in the computing process. This increases the reliability of detection of motion in a picture considerably and results in a more definite output signal S (x) of the multiplier 37.

What is claimed is:

1. A circuit arrangement for detecting an essentially horizontally directed motion of an edge in a television picture transmitted line by line over a vido-signal line using interlaced scanning, said arrangement comprising:
   a frame line circuit connected to the vido-signal line and producing scanning lines which correspond to a frame formed from alternate lines of two fields; and
   a narrow-band-pass filter circuit to which said scanning lines are fed and which has a pass frequency equal to the number of line pairs per frame formed from the corresponding lines of two fields of the frame multiplied by the number of frames per second.

2. A circuit arrangement in accordance with claim 1, wherein;
   said frame-line circuit includes a field delay circuit having its input connected to said video-signal line, and at least one line delay circuit connected to said field delay circuit; and
   said band-pass filter circuit is a computing circuit which forms a first difference value from the input signal and the output signal of said field delay circuit, and a second difference value from the input signal and the line-delayed output signal of the field delay circuit or from the output signal and the line-delayed input signal of the field delay circuit, and which multiplies the reciprocal of the absolute value of the first difference by the absolute value of the second difference, and delivers the product as a detection signal.

3. A circuit arrangement in accordance with claim 2, wherein:
   both the input and the output of said field delay circuit have a line delay circuit connected thereto; and said computing circuit forms a third difference value from the output signals of the two line delay circuits and adds it to said first difference value.

4. A circuit arrangement in accordance with claim 2, wherein:

said computing circuit including two adders for forming said first and second diference values and a multiplier;

each of said adders is followed by an absolute-value device; and the output channel of said adder for forming said first difference value contains a reciprocal-value device.

5. A circuit arrangement in accordance with claim 3, comprising: a third adder for forming a third difference value; and a fourth adder is contained in the output channel of said first adder and adds the output signal of said third adder to the output signal of said first adder.

6. A circuit arrangement in accordance with claim 1 comprising a weighting circuit connected to the output of said narrow-band-pass filter circuit and having a nonlinear weighting function.

* * * * *